United States Patent [19]

Swoboda

[11] 3,873,967

[45] Mar. 25, 1975

[54] DIRECTION-INDICATING AND WARNING BLINKER SYSTEM FOR VEHICLES, IN PARTICULAR MOTOR VEHICLES

[75] Inventor: Josef Swoboda, Bietigheim, Germany

[73] Assignee: SWF-Spezialfabrik Fur Autozubehor Gustav Rau GmbH, Bietigheim, Germany

[22] Filed: Oct. 5, 1972

[21] Appl. No.: 295,104

[30] Foreign Application Priority Data
Nov. 23, 1971  Germany............................ 2157908

[52] U.S. Cl................................. 340/66, 340/81 R
[51] Int. Cl.............................................. B60q 1/00
[58] Field of Search ......... 340/52 R, 55, 66, 67, 73, 340/74, 76, 80, 81 R, 81 F, 83

[56] References Cited
UNITED STATES PATENTS

| | | | |
|---|---|---|---|
| 2,203,502 | 6/1940 | Michel................. | 340/76 |
| 2,258,747 | 10/1941 | Doane.................. | 340/80 UX |
| 2,486,599 | 11/1949 | Hollins................. | 340/80 UX |
| 2,514,604 | 7/1950 | Hollins................. | 340/81 F |
| 2,562,274 | 7/1951 | Hollins................. | 340/81 F |
| 2,572,094 | 10/1951 | Bailey.................. | 340/55 |
| 2,698,403 | 12/1954 | Woodham............. | 340/66 X |
| 3,244,934 | 4/1966 | Wess.................... | 340/81 R X |

FOREIGN PATENTS OR APPLICATIONS
1,282,615  12/1961  France

Primary Examiner—Donald J. Yusko
Attorney, Agent, or Firm—Toren, McGeady and Stanger

[57] ABSTRACT

In a direction-indicating and warning blinker system for vehicles, in particular motor vehicles, the direction-indicating lamps and the blinker unit are wed to apply the flashing or blinker signals, controlled by the direction indicator switch, separately on either the one or the other side of the vehicle, and to apply the warning blinker signals, controlled by the warning blinker system switch, simultaneously on both sides of the vehicle. The system comprises additional lamps which are controlled by the blinker unit. One end of the additional lamps are connected to the control output of the direction indicator switch. Their other terminals are connected in common to the head lamp light switch. When the latter is "on", the supply voltage is applied to the additional lamps out of phase with respect to the direction-indicating lamps.

7 Claims, 1 Drawing Figure

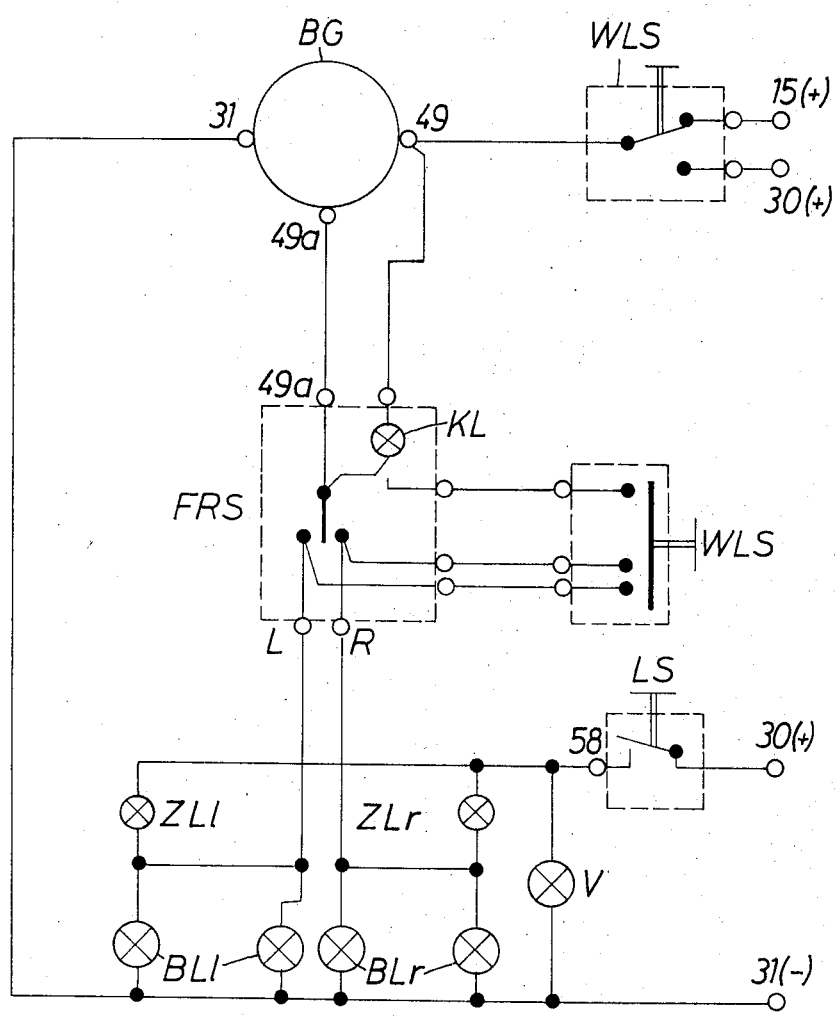

3,873,967

DIRECTION-INDICATING AND WARNING BLINKER SYSTEM FOR VEHICLES, IN PARTICULAR MOTOR VEHICLES

BACKGROUND OF THE INVENTION

The present invention relates to a combined direction-indicating and warning blinker system for vehicles, such as, motor vehicles, wherein the flashing direction-indicating lamps, controlled by the direction indicator switch, are lighted separately on either one or the other side of the vehicle, and the warning blinker signals, controlled by the warning blinker system switch, are lighted simultaneously on both sides of the vehicle.

Owing to the double utilization of both the direction-indicating lamps and the direction blinker unit it is possible to keep the cost of a combined direction-indicating and warning blinker system low.

In the case of heavy motor vehicles, such as lorries or trucks, busses, or the like, inclusion of the direction-indicating lamps in the circuits of the direction-indicating and warning blinker system is not enough. With respect to these types of motor vehicles, additional signals are desirable which permit the particular type of signalling motor vehicle to be recognized.

These heavy motor vehicles are, in particular, equipped with additional lamps, such as position lights, side marker lights, or the like for approximately indicating the size of the motor vehicle (at night).

The invention is aimed at including these additional lamps in the direction-indicating and warning blinker system circuits without requiring any additional elaborate control means, and without thus being deprived of their normal switching function.

SUMMARY OF THE INVENTION

The present invention is a combined direction-indicating and warning blinker system for motor vehicles. In accordance with the invention, the terminals of a set of additional lamps are connected to the control outputs of the direction indicator switch. Their other terminals are connected, in common to one output of the light switch for the head lamps of the car. In the switched-off condition of the light switch, the additional lamps display their flashing light signals in phase coincidence with those of the direction-indicating lamps. When the light switch is "on," the additional lamps display their blinking signals out of phase with respect to the direction-indicating lamps. These additional lamps, however, still remain controllable via the light switch independently of the direction-indicating lamps. To this end, of course, the additional lamps are required to have a substantially lower power consumption than the direction-indicating lamps connected to the control outputs of the direction indicator switch. So proportioned, the current supplying the additional lamps is insufficient to cause the direction indicating lamps to display a flashing or blinker signal.

According to the one advantageous embodiment of the combined direction-indicating and warning blinker system, the additional lamps are connected to the output of the light switch which controls, for example, the low-beam (dimmer) headlights. Moreover, the additional lamps are so designed as to have a substantially smaller power consumption than the additional loads, e.g. the low-beam (dimmer) head-light lamps that are connected to the output of the light switch.

In order to prevent the current for the control lamp of the direction-indicating and warning blinker system from affecting the current control of the direction blinker unit the control lamp is connected in parallel with the direction blinker unit.

BRIEF DESCRIPTION OF THE DRAWING

The drawing shows a circuit diagram of a direction-indicating and warning blinker system in accordance with the present invention.

DESCRIPTION OF THE INVENTION

The invention will now be explained in greater detail with reference to the embodiment given in the form of a circuit diagram of the drawing.

Whenever the ignition is on, i.e., after the ignition lock switch has been turned on, the supply voltage plus potential is applied to the direction blinker unit BG via terminal 15 alternatively, the direction blinker unit BG can be switched on by means the contact of the warning blinker system switch WLS when the ignition is off since the supply voltage is also applied to terminal 30. In either case the supply voltage plus potential is applied to the input 49 of the direction blinker unit BG which starts to operate as soon as the output loaded is applied to terminal 49a.

When direction indicator switch FRS is set to the either position L or R, either the direction-indicating lamps BL1 on the left — or the direction-indicating lamps BLr on the right-hand side of the motor vehicle are switched on, respectively, and display their intermittent light signals at a rate set by the blinker unit BG. When switching on the warning blinker system switch WLS, the three terminals of the direction-indicator switch are connected to one another, so that all of the direction-indicating lamps BLl and BLr are switched on simultaneously and display intermittent light signals at the rate set by the blinker signal unit BG. Owing to the fact that the control lamp KL is connected in parallel with the blinker unit, this control lamp lights out of phase in with to the direction-indicating lamps. Accordingly, the current to operate the control lamp has no detrimental influences upon the current supervisory system of the blinker unit.

The additional lamps ZL*l* as arranged on the left-hand side, and the additional lamps ZL*r* as arranged on the right-hand side of the motor vehicle, are connected to the control outputs L and R of the direction indicator switch FRS. The common terminals of these additional lamps ZL*l* and ZL*r*, which are connected to one another, are connected to the output terminal 58 of the light switch LS. The latter provides the supply voltage plus potential only when the light switch is in the "on" position. The output of the light switch LS controls, for example, the low-beam (dimmer) head-light lamps of the motor vehicle. The light switch LS is capable of applying the supply voltage plus potential when the ignition is either on or off, since the supply voltage is always applied to terminal 30. The various loads which are capable of being switched on by the light switch LS are represented in the drawing by an electric (glow) lamp V.

The mode of operation of the novel combined direction-indicating and warning blinker system is as follows:

With the light switch LS turned off (i.e., day operation) and the direction indicator switch FRS in the "on" position, the additional lamp, e.g., ZLl, assigned to the selected side of the vehicle, is synchronously controlled as well. The circuit for this additional lamp is completed via the load V and the parallel circuit comprising, the additional lamp, e.g., ZLr, in series with the direction-indicating lamps, e.g., BLr associated with the non-selected side of the vehicle. When the warning blinker system switch WLS is activated, the two additional lamps ZLl and ZLr are synchronously controlled as well. The circuit for these additional lamps is completed via the load V. Since the power consumption of the additional lamps ZLl and ZLr is low compared to the power consumption of the direction-indicating lamps BLl and BLr and of the load V, the non-selected lamps or loads, respectively will only receive a current which is insufficient to operate them.

When the head-light switch LS is turned on for night operation, the additional lamps ZLl and ZLr are lit permanently. The direction indicating lamps BLl and BLr receive insufficient current to operate and, therefore, do not display light signals.

During direction-indicating blinker operation the direction indicator switch FRS applies the blinker potential of the blinker signal unit BG to the connecting point between the selected direction indicating lamps, e.g., BLr, and the associated additional lamp, e.g., ZLr. In this case, the controlled additional lamp lights out of phase with respect to the selected direction-indicating lamps at the rate set by the blinker unit BG. The non-controlled additional lamp, e.g., ZLl, remains lit continuously as does the load V.

During the warning blinker operation all direction indicating lamps BLl and BLr are controlled in parallel and display their intermittent light signals at the rate set by blinker unit BG. It will be noted that where the head-light switch is on the additional lamps ZLl and ZLr, are short-circulated whenever the supply voltage plus potential is connected through by the blinker unit BG. Hence, these additional lamps are lit inversely in with respect to the direction-indicating lamps. During the intervals of the blinker unit BG, the current for the additional lamps flows via the associated direction-indicating lamps which are of higher wattage rating and, hence, without causing the latter themselves do not light.

Thus, in summary, by inserting the additional lamps in the circuit, the additional lamps are controlled in synchronism with the controlled or operated direction-indicating lamps during daytime. When driving at night the additional lamps are first of all lit permanently, and are then respectively inversely controlled as well in accordance with the operation of the direction-indicating lamps, i.e., with an interchanging dark and light period.

What is claimed is:

1. A combined direction-indicating and warning blinker system for vehicles having head lamps and a power source, comprising:
   switching arrangement connected to the power source and having a pair of output terminals each corresponding to one side of the vehicle;
   said arrangement having direction indicator switch means for selectively directing flow of current to the terminals and blinker means for intermittently interrupting the current flow;
   a first set of direction-indicating lamps coupled to one output terminal of the switching arrangement;
   a second set of direction-indicating lamps coupled to the other output terminal of the switching arrangement;
   a light switch connected to the power supply and in series with head lamps of the vehicle; and
   a first and second set of additional lights, the first set being connected between said light switch and one of the output terminals and the second being connected between the light switch and the other of said output terminals
   said additional lamps consuming substantially less power than either the direction-indicating lamps and the head lamps so that when an additional lamp or a head lamp and a direction-indicating lamp are connected in series only the additional lamp lights.

2. A system as in claim 1, wherein said indicator switch means and said blinker means are connected in series with each other.

3. A system as in claim 1 wherein said light switch has a low-beam terminal and said additional lights are connected to the low-beam terminal.

4. A system as in claim 2, wherein said light switch has a low-beam terminal and said additional lights are connected to the low-beam terminal.

5. A system as in claim 1, wherein said arrangement includes a control lamp connected in parallel with said blinker means.

6. A system as in claim 2, wherein said arrangement includes a control lamp connected in parallel with said blinker means.

7. A system as in claim 2, wherein said blinker means are connected to the supply and said switch means form said output terminals.

* * * * *